J. L. FITTS.
VOLUME REGULATING VALVE.
APPLICATION FILED SEPT. 10, 1917.

1,401,468.

Patented Dec. 27, 1921.
5 SHEETS—SHEET 1.

INVENTOR
James Logan Fitts.
BY
ATTORNEYS

J. L. FITTS.
VOLUME REGULATING VALVE.
APPLICATION FILED SEPT. 10, 1917.
1,401,468.
Patented Dec. 27, 1921.
5 SHEETS—SHEET 2.
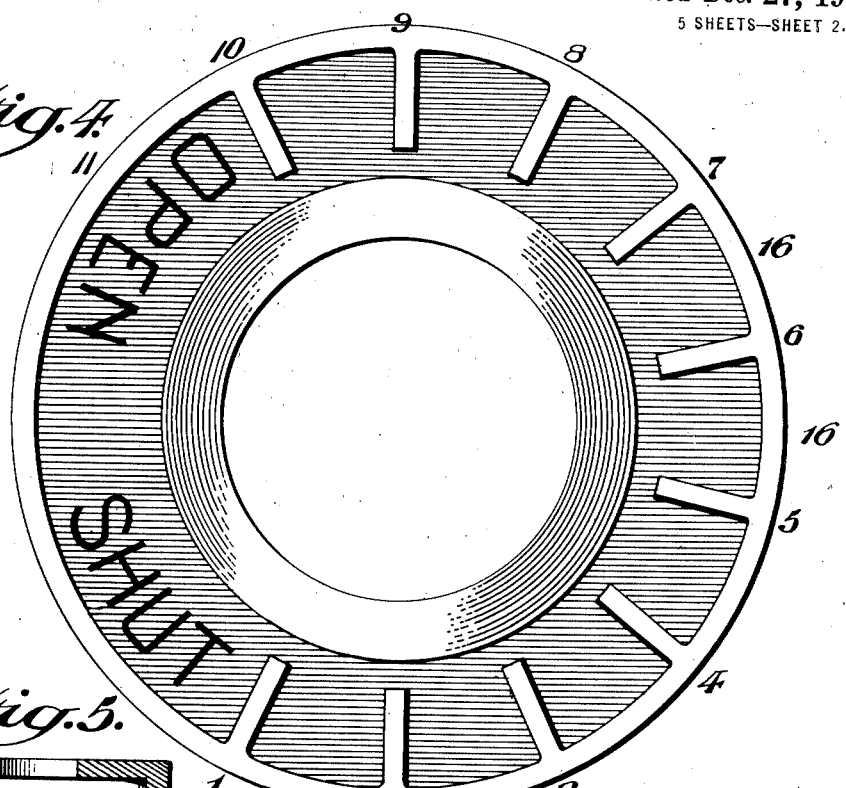
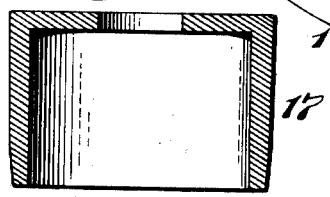
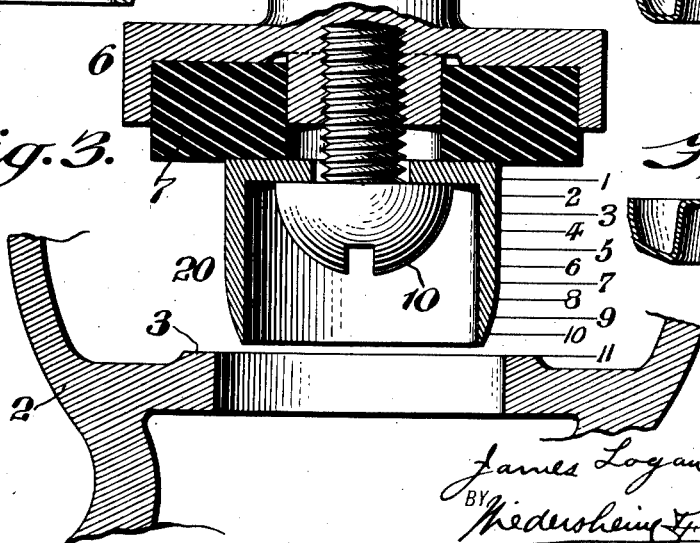
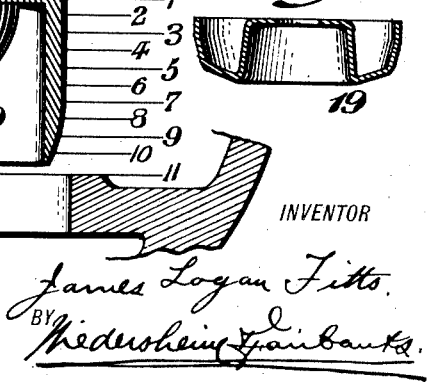
INVENTOR
James Logan Fitts.
BY Wiedersheim Fairbanks
ATTORNEYS

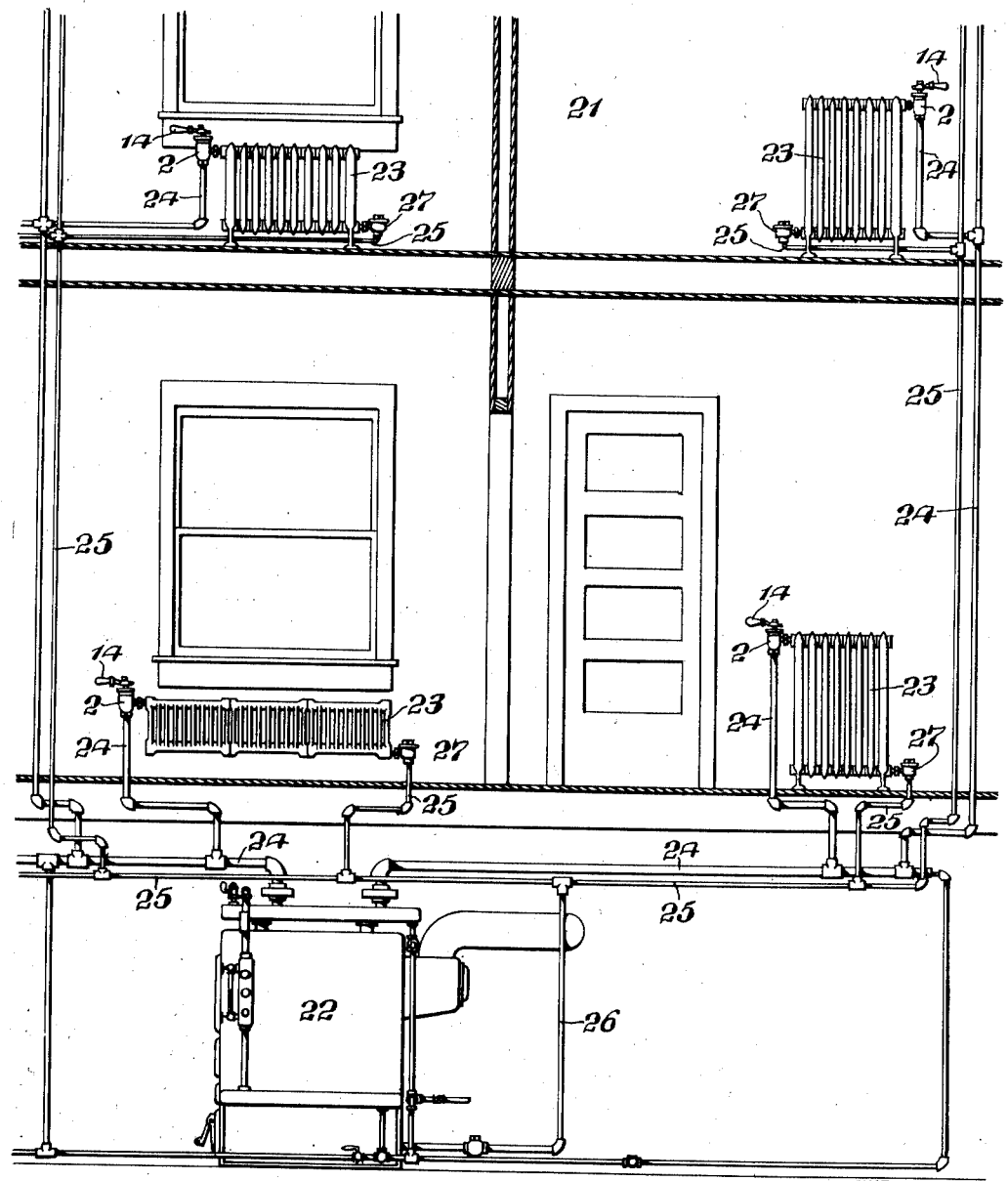

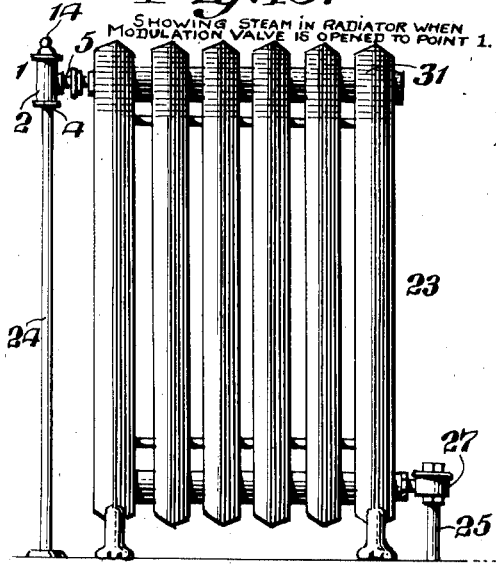
Fig. 10. SHOWING STEAM IN RADIATOR WHEN MODULATION VALVE IS OPENED TO POINT 1.
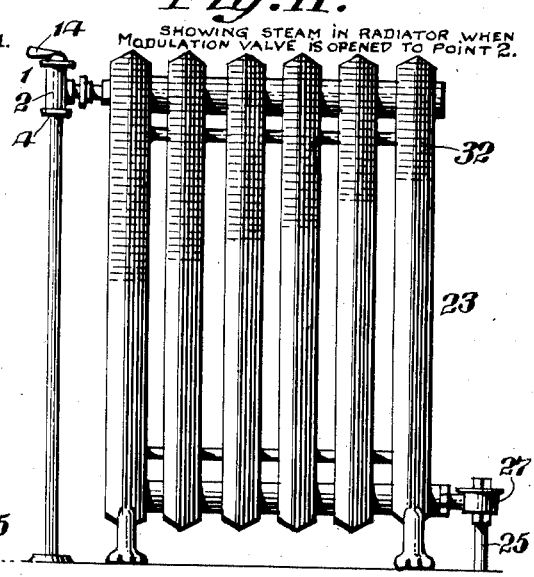
Fig. 11. SHOWING STEAM IN RADIATOR WHEN MODULATION VALVE IS OPENED TO POINT 2.
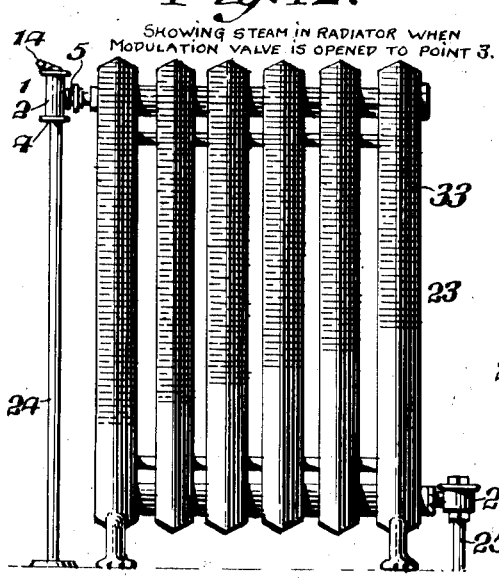
Fig. 12. SHOWING STEAM IN RADIATOR WHEN MODULATION VALVE IS OPENED TO POINT 3.
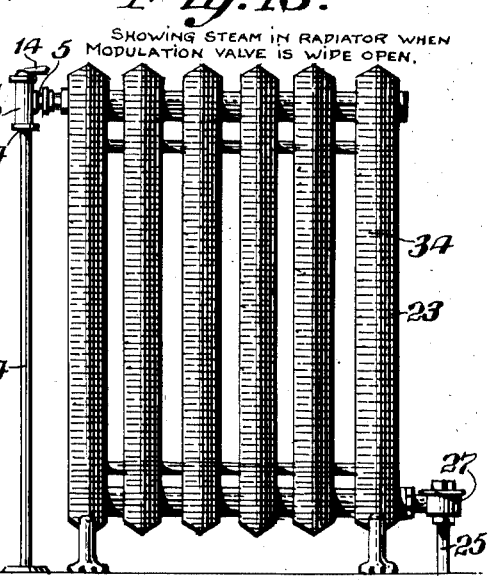
Fig. 13. SHOWING STEAM IN RADIATOR WHEN MODULATION VALVE IS WIDE OPEN.

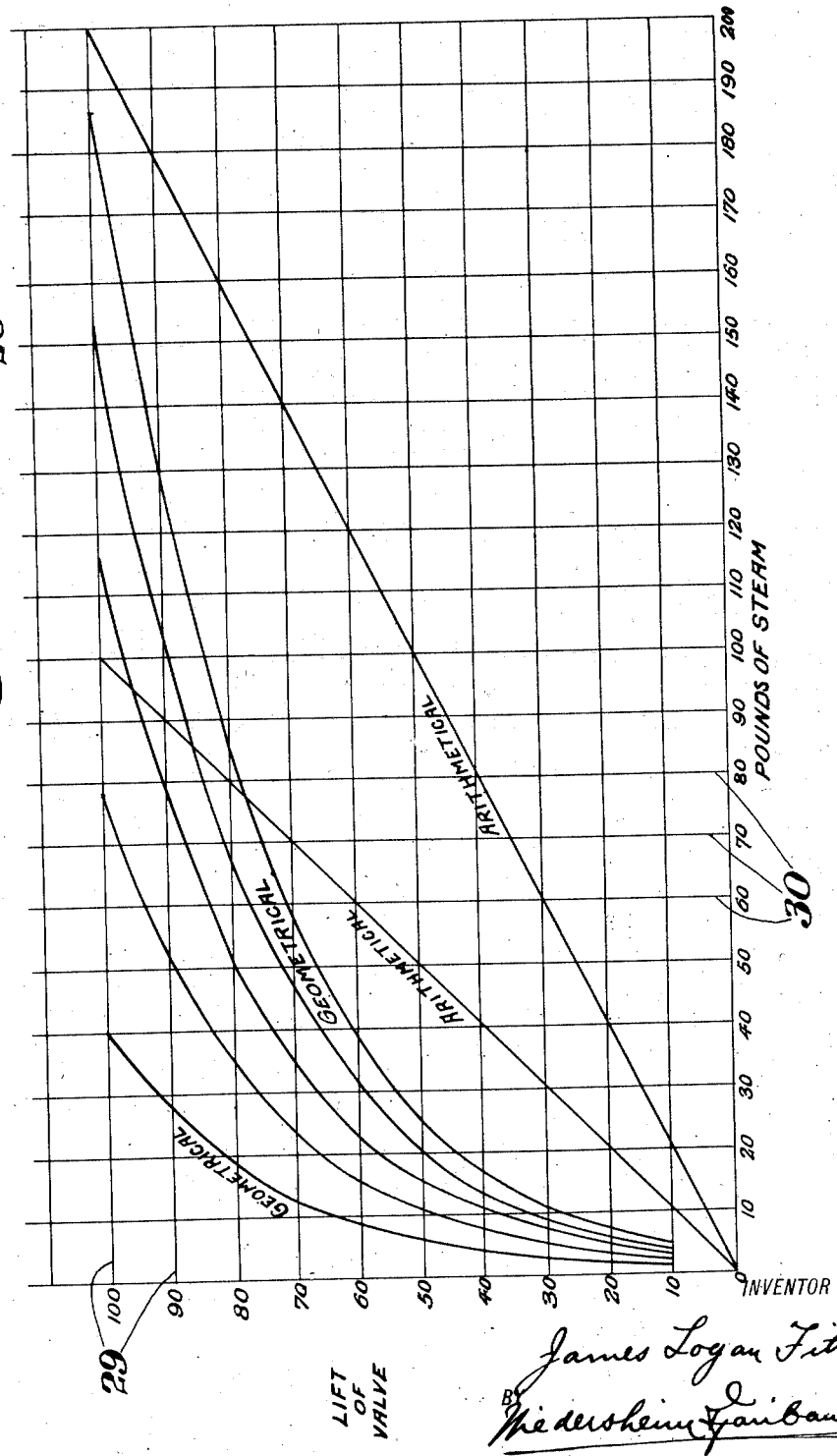

UNITED STATES PATENT OFFICE.

JAMES LOGAN FITTS, OF MERCHANTVILLE, NEW JERSEY, ASSIGNOR TO WARREN WEBSTER & COMPANY, OF CAMDEN, NEW JERSEY, A CORPORATION OF NEW JERSEY.

VOLUME-REGULATING VALVE.

1,401,468.  Specification of Letters Patent.  Patented Dec. 27, 1921.

Application filed September 10, 1917. Serial No. 190,425.

*To all whom it may concern:*

Be it known that I, JAMES LOGAN FITTS, a citizen of the United States, residing at Merchantville, in the county of Camden, State of New Jersey, have invented a new and useful Volume-Regulating Valve, of which the following is a specification.

It is well-known to those skilled in the art that it is somewhat difficult for the average person to make the proper adjustment with the ordinary hand-controlled radiator valve, so as to admit only the volume of steam or heating medium required to produce the desired temperature, since in a properly operated heating system, only the necessary amount of heating medium should be admitted to the radiator to give off the amount of heat required to maintain the desired temperature in the apartment, which required amount varies with changes in the weather conditions, hence, it is desirable not only to provide a very minute opening when desired, but also to obtain very small variations in the size of the opening, and the valve should also have capacity for being tightly closed, when desired, to completely shut off the supply and to be fully opened when a full supply is required.

It is further more well-known to those skilled in the art, that with ordinary hand valves having a valve member proper which controls the size of the thoroughfare by its movement to and from the valve seat, it is very difficult to obtain nice adjustments, since the area of the opening is ordinarily the annular space between the valve and its seat, and a small movement of the valve stem will produce a substantial movement in the valve proper and corresponding variations in the area of the opening.

It is furthermore well-known that the ordinary stop valve usually requires more than one turn of the handle to fully open the same, and that such ordinary admission valve used for the steam supply of the radiators is not so designed to obtain readily a proper regulation of the volume or control the steam flow, that fractional portions of the radiator will be heated by the steam and thus impart to the room the small quantity of heat desired during mild weather or after the room has been heated to the desired temperature, to make up for heat loss of walls, windows, air change, etc., since with the ordinary valve, upon slightly "cracking" the valve, the volume of steam is excessive and a further opening of the valve causes a highly increased volume to such an extent that only one highly skilled can properly manipulate such ordinary valve and obtain even then the approximate results desired.

While there are valves in use today which are termed quick opening or fractional valves which open within one turn of its screw stem handle, the difficulty above explained is accentuated in such valves because when "cracked," the volume of flow is or may be greater than desired.

To obviate the disadvantages of the foregoing structures, I have devised a novel method of regulation or control of the flow of fluids through a novel valve construction, so that the proportion of fluid passed will be comparatively small upon the initial and early openings of the valve, as related to the angular advance of a handle turning the screw stem controlling the valve opening, and upon further opening of the valve, the flow of the volume of the fluid will be proportionately greatly increased.

My novel valvular construction is especially adapted to fractional or graduated opening or modulating valves for controlling the volume of steam supplied to heating radiators or other devices for heating or other purposes.

To the above ends, I have devised a novel construction of valve and indicia applicable thereto or coacting therewith, whereby the full opening of the valve may be obtained within one turn or less of the valve stem, and the position of the valve with respect to its seat may be at all times visually ascertained, my invention in its broad aspects not being limited to the specific construction of valve or its adjuncts shown herein, as its principles may be applied to all valves comprising screw stem or direct lift gate valves, and in fact to all valves which may be constructed to embody the general features of my invention, as will be hereinafter explained.

For the purpose of illustrating my invention, I have shown in the accompanying drawings certain forms thereof which are at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

To the above ends, my invention consists of a novel construction of a radiator valve for a steam heating system, and it also consists of the novel application of such a valve and its adjuncts to the piping of a plurality of radiators comprising a steam heating system, as will be hereinafter explained.

Other novel features of construction and advantage will hereinafter more clearly appear in the detailed description of my invention.

Fig. 3 represents, on an enlarged scale, a fragmentary view of another embodiment of my invention, showing particularly the conoidal plug constituting the valve, provided with indicia representing equal increments of lift corresponding to the equal angular spaces of the dial, seen in Figs. 2 and 4.

Fig. 4 represents, on an enlarged scale, a plan view of the top of the valve seen in Fig. 2, the handle being removed.

Figs. 5, 6 and 7 represent sectional views of different forms of valves or valve bodies, which may be employed in carrying out my invention.

Fig. 9 represents a diagrammatic view of a steam heating system, including the boiler, radiators, radiator valves, traps and piping to which my invention is applicable.

Figs. 10, 11, 12 and 13 represent side elevations of a radiator showing relative portions thereof filled with the heating medium according to the various positions in which my novel valve is set.

Fig. 14 represents a diagram or graph showing the relations of the arithmetical ratios, the diagonal side lines, and the geometrical ratios and curves for portraying graphically the results obtained in pounds of steam according to the lift of the valve.

Similar numerals of reference indicate corresponding parts.

Referring to the drawings:—

Figure 2:
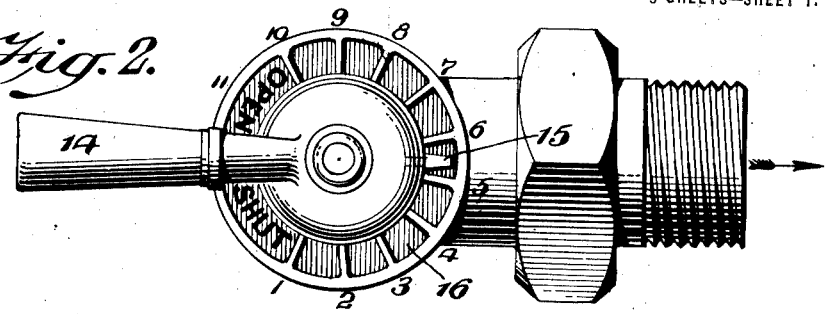
Fig. 2 represents a plan view of Fig. 1.
Figure 1:
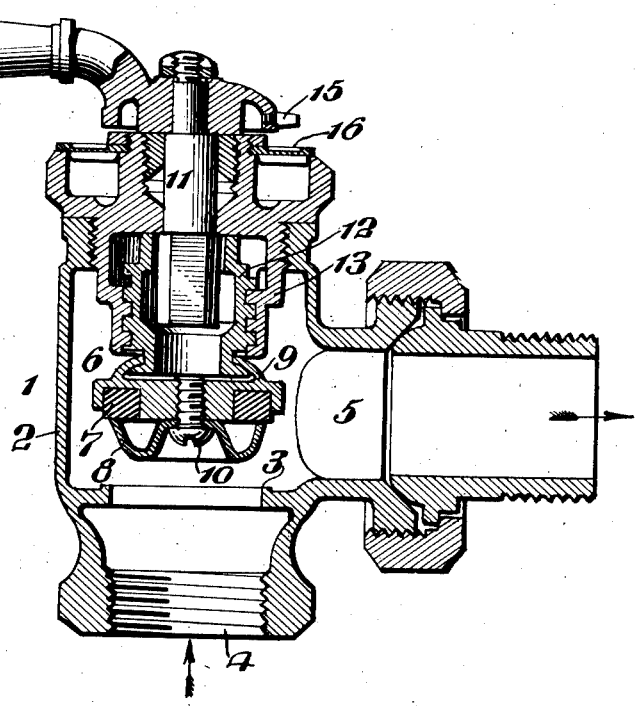
Figure 1 represents a vertical sectional view of a volume regulating valve embodying my invention.

Referring first to Fig. 1, 1 designates my novel construction of modulating or volume regulating valve, the same comprising the valve casing or body 2 having the seat 3, the inlet 4 and the outlet 5. 6 designates the valve piece or valve proper, the same comprising the disk 7, and the conoidal shaped plug or valve 8, which is secured to the member 9 by the screw 10 or the like. 11 designates the valve stem which carries the screw 12 which is rotatably mounted in the stationary member 13, said stem carrying the handle 14, which is provided with a pointer 15, which is located above the dial or scale 16, which is provided with suitable indicia or numerals ranging from 1 to 11, as will be understood from Figs. 2 and 4, the position of said pointer with respect to said scale indicating the degree in which the valve is opened or closed. The scale 16 is shown in the present instance as having even angular divisions, as it is obviously more readily read, but these divisions may be spaced in a geometrical ratio order so as to thereby assist in indicating the function or position of the valve.

It will be evident that the scale 16 may be spaced or arranged otherwise than in the manner shown in Figs. 2 and 4, but for purposes of illustration, I have preferably shown the conoidal plug 8 and said scale as indicated, although I do not restrict my invention to the precise form shown.

In Figs. 5, 6 and 7, I have shown different forms of valves or valve plugs which may be employed, as 17, 18 and 19, respectively, it being apparent that the valvular function attained during the opening and closing of the valve is substantially the same as that seen in Fig. 1, or in Fig. 3, the valve member in the latter being indicated by 20, and the numbered lines at the right thereof representing equal increments of lift corresponding to the equal angular spaces on the dial or scale 16, seen in Figs. 2 and 4, and which are numbered to correspond.

Figure 8:
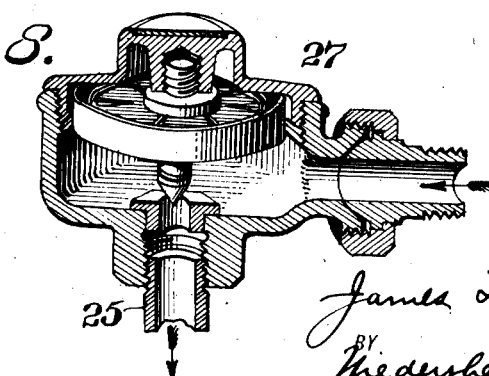
Fig. 8 represents a perspective view, partly in section, of a trap employed in a steam heating system embodying my invention.

Referring now to Fig. 9, I have shown therein a diagrammatic layout of a steam heating system 21 to which my invention is applicable, and wherein 22 designates a boiler or source of steam and 23 radiators to which steam is admitted through the modulation valves 2 by means of the supply pipes 24. 25 designates the return pipes whereby the water is returned to the boiler 22, through the main return 26. 27 designates traps which may or may not be used, and as any conventional form of trap 27 may be employed, as seen in Fig. 8, any further description thereof or the steam heating system seen in Fig. 9, is unnecessary, as the general construction and operation thereof will be familiar to those skilled in the art.

28 designates a diagram or graph seen in Fig. 14, having a series of horizontal lines or indicia as 29, which graphically portray the point of lift of the modulating valve, while the vertical lines as 30 graphically portray pounds of steam passed, said graph showing also the relations of the arithmetical ratios or the diagonal straight lines, and the geometrical ratios or curves from which a general idea of the results obtained may be noted.

The point of lift of the valve indicated at the left of Fig. 14 and the base scale in said figure representing pounds of steam passed, are translatable into square feet of radiation, volumes of steam and thermal units, which are all interrelated and apply to both arithmetical and geometrical ratios.

Referring now to Figs. 10 to 13 inclusive, it will be seen that in the upper portions of Figs. 10, 11 and 12, I have indicated the radiator sections as being horizontally shaded, the shading at 31 on Fig. 10 showing the steam in the radiator when the modulation valve, seen in its various embodiments in Figs. 1 to 7, is opened to point 1, see Figs. 2, 3 and 4.

The shading indicated at 32 in Fig. 11 graphically portrays the amount of steam in the radiator when the modulation valve is opened at the point 2, see Figs. 2, 3 and 4, while the shading as indicated at 33 in Fig. 12 shows the steam in the radiator when the modulation valve is opened at the point 3, see Figs. 2, 3 and 4.

In Fig. 13, I have shown the entire radiator as filled with the heating medium, as indicated by the shading 34, which indicates the amount of steam in the radiator when the modulation valve is wide open. The manipulation of any of the alternative forms of valve structure seen in Figs. 1, 3, 5, 6 and 7, in the manner above described, will admit steam to the radiator to the extent indicated in Figs. 10 to 13, as is obvious.

It will be understood by those skilled in the art that in the manipulation of an ordinary valve, if the volume of fluid as steam, passing therethrough is carefully measured, it will be found that for equal increments in opening or lift of the valve proper from it seat, practically an equal increase in volume flow will occur, which increase may be expressed in arithmetical progression by for example 1, 3, 5, 7, 9, and so on or any other progression represented by the formula $V \times R^N$ in which V is the unit volume, R is the rate and N is the term of the progression as removed from the unit taken. This progression may be expressed graphically in a straight line which will lie across the graph, as seen in Fig. 14, at any angle with the base, depending on the rate R taken and in the specific valve in accord with the proportions of seat area and total lift of valve.

In my present invention, I have constructed the valve seen in Figs. 1, 3, 5, 6 and 7 upon the principle or in such manner that the increase in volume will be approximately in accord with a geometrical progression, such as is represented by 1, 2, 4, 8, 16, 32 and so on, and which may be represented by the formula $V \times R^N$ in which V is the basic volume, R is the rate and N being any power to which R is raised.

It will be noted that the rate R may be any quantity which if continuously used and being raised to any power will represent the increase in the volume of fluid and fill the conditions as required.

The geometrical progression if plotted graphically will show a curve as indicated at the left of Fig. 14, the general angle of which from the base will be great but which as the progression proceeds will bend outwardly and curve to a line, and the angle with the base will be much less up toward the end of the series, the diagram 28 in said Fig. 14 showing both the arithmetical and geometrical lines and fully illustrating the results obtained.

On this point of a variable, it has been found in practice that owing to the friction of the fluid and when saturated steam is used, the condensation in the form of mechanically suspended globules of water changes the flow, so that variations in the ratio are desirable to compensate for the lack of latent heat of the water as against the steam. In fluids other than steam or air carrying water globules, this variation in the ratios is not so desirable except to compensate for the friction only, but the variations, as before stated, will not in any manner change the principle or method herein involved.

It will be understood that the quantity R need not necessarily be held constant but itself may be varied for each term or may be continued for a number of terms and then changed or may be in itself varied each term, with the result of a corresponding change in area of orifice and in volume of fluid passed, which latter method while not in strict geometrical progression, will not in any manner affect the practical working of my invention.

A mathematical formula defining my novel conoidal shape may be computed as follows after first having determined the maximum volume at full open, which may be called "B" and the volume to be discharged at the first point taken, say $\tfrac{1}{10}$ the lift, and calling it "A," the ratio "R" being determined by the formula $R = \sqrt[n-1]{\dfrac{B}{A}}$, and if equal increments in the lift of the valve are taken as one of each of the several terms of the ratio, and we select 10 terms (though any number may be used) then the areas of annular space between the surface of the conoidal valve head and the seat edge are known and can be readily computed, and the exact curve having been originated, the reproduction in the manufacture of the conoidal valves can be readily carried out.

I am aware of the patent to Serrell, No. 991,550, showing an elongated valve member, provided with elongated slots which, although a step toward the results I have attained, is not in accord with the principle of my present invention and is incapable of producing the results which I attain. I am also aware of the patent to Wiley, No. 1,200,676, wherein is disclosed a calibrating plug telescoping within a valve piece, wherein during the early portions of the opening, his valve follows the admission rate of an ordinary valve, and wherein it is only when the circular area between the valve and seat become equal to the annular ring area between the plug and the seat edge, that there is obtained any regulating of volume.

The Wiley valve aforesaid is adjustable as to the maximum volume passed through the valve, the initial volume being increased, while the latter part of the valve lift controls the volume in arithmetical ratio.

My invention is differentiated from the Wiley patent aforesaid, since after first cracking my valve from its seat in my invention, the volume is controlled in geometrical ratio until a maximum volume is reached, which is predetermined, which method and construction I am the first in the art to employ, and my claims to these features are therefore to be interpreted with the scope accorded to inventions of this character.

I am also aware of Patent No. 941,703, which discloses another form of valve in which provision is made for the area of the passage through the thoroughfare of the valve to be increased step by step, which structure, while another step toward the principle of this invention, I have found in practice does not produce the same results as my invention, since the curve will be irregular or jerky and not of the character seen in Fig. 14 herein.

In practice, I have found that while holes of increasing areas overlapping to a certain extent, or slots carefully machined to definite dimensions, as in the patents above described, will give results designed to approach the results which I attain, nevertheless I have found in practice that the form of conoidal plug attached to the valve and entering the circular seat opening of the valve casing, of the general character seen in Figs. 1, 3, 5, 6 and 7 will produce the best results, but while I have selected this construction as best exemplifying the principle of my invention, I reserve the right to use any of the forms referred to or modifications thereof so long as they embody the general idea of the geometrical progression, whether orderly or varied to suit the purpose desired.

It will now be apparent to those skilled in the art that if a valve of the type above described, as typical of my invention, is opened so that the valve is above the seat or unseated to the extent shown by the line 1 on Fig. 3, then the annular orifice will have an area to pass the volume V of the formula above referred to. If said valve is further opened or unseated to the line 2, Fig. 3, then the annular orifice between the side of the plug or valve proper and seat opening will have an area to pass volume $V \times R'$ of the formula. If the valve is raised to the line 3, Fig. 3, then the annular orifice will be equal to an area to pass the volume $V \times R'$ so that by the proper shaping of the conoidal plug, I may obtain a gradual and slight increase in flow of fluid, which as the lift is increased will increase greatly until the full lift is reached at the desired maximum capacity of the valve.

It will be further evident that if the curve of the conoidal plug is so made to conform to produce area of opening permitting flow of fluid as per the curves of the diagram seen in Fig. 14, then in a valve 2 attached to a radiator, when the handle index or pointer is at 1, see Figs. 2 or 4, the volume of the heating medium passed will be slight, as shown at the point 1 on the diagram Fig. 14. If the index of the valve handle is at 2, then the volume will be as at the point 2 on the diagram seen in Fig. 14 and so on, so that by this manipulation of a valve constructed in accordance with the principles I have hereinbefore explained, a radiator will receive steam to heat a surface as 31, 32 or 33, as shown in Figs. 10, 11 and 12, as hereinbefore explained, the entire surface of the radiator being heated or the radiator full of the heating medium when the valve is wide open, as indicated at 34 in Fig. 13.

It will now be apparent that the advantages of my invention consist in a much closer regulation of the flow of the heating medium than would be possible otherwise by an inexperienced person or wherein certain processes require close regulation of flow and prevention of flooding upon "cracking" the valve.

It will be apparent from Fig. 3, that upon opening the valve to the line 1 seen therein, the dial spacing seen in Figs. 2 and 4 being wide, good and close control may be obtained, and that while approaching the line 9 a very large volume may be obtained and yet perfect control or regulation obtained.

The various forms of conoidal valve members or valve plugs seen in Figs. 1, 3, 5, 6 and 7 which are drawn substantially to scale may be used to vary the flow of the heating medium and upon the basis of the general formula above named, it being obvious that each form of valve plug will admit a proportionate increase in volume of flow up to the maxium upon the principle explained.

I have used the term "conoidal" herein, as descriptive of a form which is not spherical not yet a cone, but a form made up of continually changing curves on a generally conical surface, its horizontal cross section wherever taken being circular.

It will be seen from the foregoing that by the application of my invention to a steam heating system, provision is made corresponding to the variations of demand for heat from the radiator, the latter being entirely filled with the heating medium in cold weather to the extent indicated in Fig. 13, when it is necessary to heat the entire surface of the radiator, while in more moderate weather, the need for the heating medium is reduced, so that only a proportionate area of the required heating surface need be utilized, as will be understood from Figs. 10, 11 and 12.

It will be apparent that while I have shown my invention as especially adapted for use in a steam heating system, I do not desire to restrict the use thereof in every instance thereto, as my novel construction of valve and its adjuncts can be employed in the regulation or control of other fluids than steam and the same is useful in all situations or in any processes which may require close regulation of flow and prevention of flooding upon "cracking" the valve.

It will now be apparent that I have devised a novel and useful construction of a volume regulating valve which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. The herein described method of controlling the flow of a fluid, which comprises the proportioning of a valve plug with respect to the port area of the seat controlled thereby as herein described so as to obtain a minimum initial flow with maximum valve movement in the early stages of movement and a greater proportionate increase of volume of flow as the maximum opening of the valve is approached.

2. The herein described method of controlling the flow of a fluid, which consists in so proportioning a conoidal valve plug with respect to its port area as herein described to obtain a minimum initial flow with maximum valve movement in the early stages of movement and a greater proportionate increase in volume of flow as the maximum opening of the valve is approached.

3. The herein described method of proportioning the area of a valve opening for controlling the flow of a fluid so that for equal increments of lift the volumes passed will be geometrically increased in volume as herein described.

4. The herein described method of constructing a valve port area for controlling the flow of fluid, so that at the initial equal proportionate opening of the valve, the volume will be small and increasingly greater in geometrical ratio as herein described until the maximum volume is approached.

5. The herein described method of proportioning the lift and valve port areas, for controlling the flow of a fluid without reference to the actual areas of the valve opening at any point so that the increase or decrease in volume of flow will be in the geometrical ratio V to $V \times R^N$ or 1 to $R^N$, V being the unit volume, R being any chosen factor and N being the valve lift.

6. In a device for controlling the flow of fluids the proportioning of the port areas to the opening of the device to obtain volumes of flow approximating the formula $V \times R^N$, V being the unit volume, R being any chosen factor and N being the valve lift.

7. In a valve, a valve seat with a port therethrough and a coacting conoidal valve piece so designed that with equal increments of lift of the valve, the areas of openings and corresponding volumes of flow shall be a geometrical ratio in the formula $V \times R^N$, V being the unit volume, R being any chosen factor and N being the valve lift.

8. The herein described method of producing a flow in geometrical ratio in a valve by means of a conoidal valve head, constructed substantially as shown and described.

9. In a valve, means for producing a flow therethrough in geometrical progression.

JAMES LOGAN FITTS.

Witnesses:
F. JOSEPH MILLER,
WILLIAM H. SNYDER.